(No Model.) 2 Sheets—Sheet 1.
G. W. HARDESTY.
BRICK MAKING MACHINE.
No. 304,100. Patented Aug. 26, 1884.
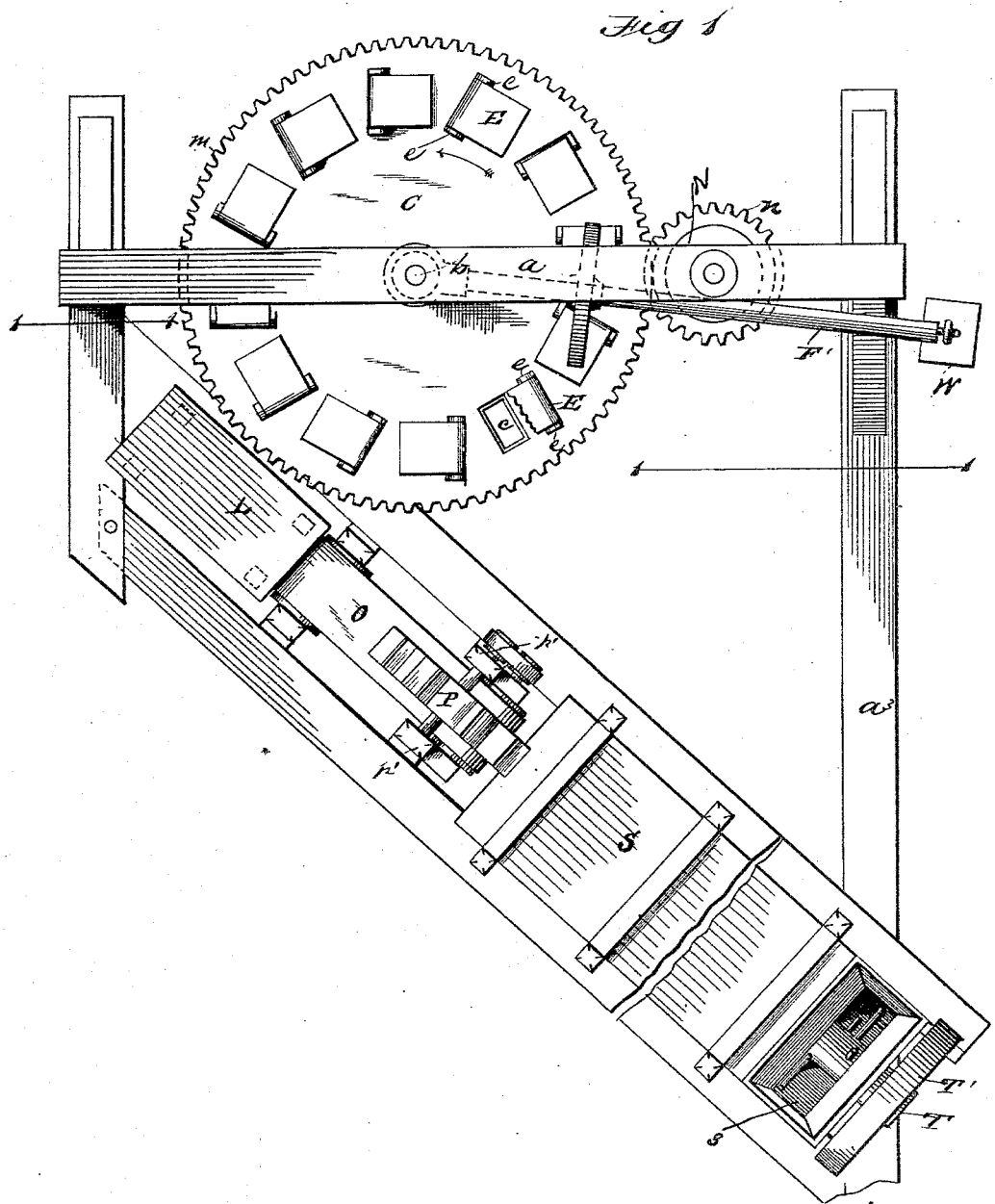
Attest:
W. H. N. Knight
Saml. P. C. Jacobson
Inventor:
George W. Hardesty,
by his attorneys,
Abraham T. Mayer.

(No Model.) 2 Sheets—Sheet 2.
G. W. HARDESTY.
BRICK MAKING MACHINE.
No. 304,100. Patented Aug. 26, 1884.
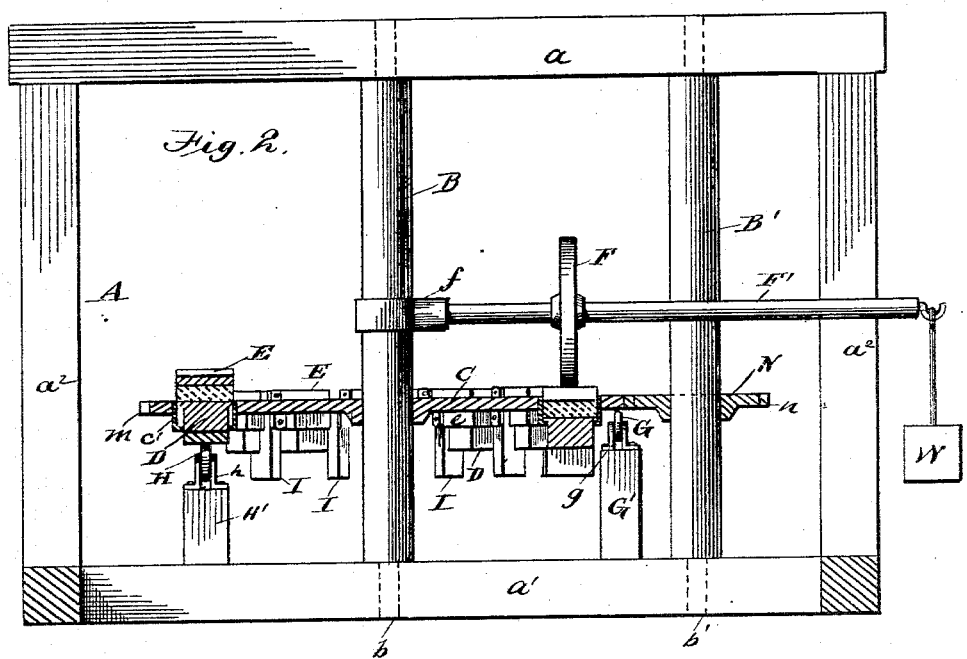
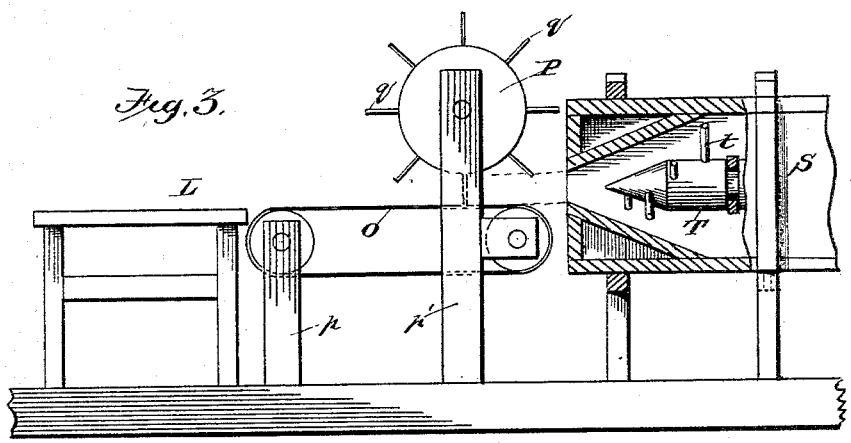
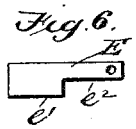
Attest
W. H. H. Knight
Saml. B. C. Jacobson
Inventor:
George W. Hardesty,
by his attorneys
Abraham & Mayer.
N. PETERS. Photo-Lithographer, Washington, D. C.

UNITED STATES PATENT OFFICE.

GEORGE W. HARDESTY, OF KEOKUK, IOWA.

BRICK-MAKING MACHINE.

SPECIFICATION forming part of Letters Patent No. 304,100, dated August 26, 1884.

Application filed February 16, 1884. (No model.)

*To all whom it may concern:*

Be it known that I, GEORGE W. HARDESTY, a citizen of the United States, residing at Keokuk, in the county of Lee and State of Iowa, have invented a new and useful Improvement in Brick-Making Machines, of which the following is a specification.

My invention relates to rotary brick-making machines, and comprises means for producing an even and smooth condensed brick.

The nature and object of my invention consist in novel means for tempering the brick-clay and forming it into a dense homogeneous mass, and after it is tempered or set, and while in a plastic condition, then leading the plastic mass into a mold and subjecting it to pressure, then removing all the clay that is pressed out of said mold.

My invention further consists in certain novel construction of devices that constitute a rotary brick-making machine, and in the arrangement, assemblage, and combinations of its several parts, all as hereinafter described, and set forth in the claims.

Referring to the accompanying drawings, in which similar letters of reference point out like parts on each figure, Figure 1 is a top plan view of my improved brick-machine. Fig. 2 is a side elevation of the turn-table, taken on the line 1 1 of Fig. 1. Fig. 3 is a side elevation of the sand-table carrier-belt, cutting-wheel, and a portion of the pug-mill and its inclosed clay-mixing crab. Fig. 4 is a sectional view taken through one of the molds. Fig. 5 is a view of a false bottom of one of the molds detached. Fig. 6 is a view of the hinged upper press-blocks.

In the drawings, A represents the frame, consisting of upper and lower cross-timbers, $a\ a'$, and uprights $a^2$. Said frame is provided with sills $a^3$, that connect the frame A to the pug-mill, as shown in Fig. 1.

B B' represent shafts, preferably of wood, and either square or round in cross-section. Said shafts are journaled at $b\ b'$ in the upper and lower timbers of the frame A, and one of said shafts, B, carries a turn-table, C, preferably wholly of metal. Said table C is provided with rectangular apertures $c$. Each aperture is lined at its sides with steel plates $c'$, the lining-plates having lower returns or flanges, $c^2$, thus forming a frame or box, open at its top and bottom. The purpose of the flanges $c^2$ is to receive and support the flanges $d$ of the false or movable bottom D. The bottom D has a downwardly-projecting portion, $d'$, that passes through the aperture between the flanges $c^2$ of the steel box. The upper surface of the turn-table C is provided with a series of lugs or ears, $e$, between which is pivoted one end of a press-block, E. The portion $e'$ of the press-block E is somewhat thicker than the part $e^2$, (see Fig. 6,) said thicker portion lying directly over the mold and operating as a top or cover to receive pressure applied by a wheel, F, mounted loosely upon a shaft, F', at one side of the turn-table C. As will be seen, the wheel F is directly above the centers of the molds. One end of the shaft is loosely journaled in a strap, $f$, surrounding the shaft B, the opposite outer end being provided with a weight, W, suspended therefrom, by which the desired amount of pressure is given to the clay in the molds.

G represents a small wheel placed below the turn-table at a point nearly beneath the wheel F. The wheel G is mounted upon a box, $g$, secured to the top of an upwardly-projecting timber, G', and said wheel supports the turn-table when pressure is applied to the top thereof by the wheel F.

H represents a second small wheel, mounted on a box, $h$, secured to the top of a block, H'. The wheels H are in alignment and under the molds and operate to raise a series of swinging flaps, I, hung between lugs $i$, projecting from the lower surface of the turn-table, and said flaps I operate in turn to raise the false bottoms D as each in turn is presented to the action of the wheel H. The swinging flaps are in number equal to the molds, being pivoted at one side of each of said molds between lugs, as hereinbefore stated. The turn-table has peripheral teeth $m$, that mesh with teeth $n$ upon a pinion, N, mounted upon the shaft B', by which motion is imparted to the turn-table C. If desired, power may be imparted to the turn-table shaft direct and without intervention of the pinion-wheel N.

L represents the sanding-table, upon which the material for the brick passes from the carrier-belt O. The pulleys or drums of the belt O are journaled in uprights $p\ p'$, one pair of which, $p'$, extend upward and form bearings for a cutting-wheel, P, having knives q arranged at regular distances around its periphery.

S represents the tempering pug-mill, into which the material is fed through a hopper at s, and within which said material is acted upon by teeth t, spirally arranged about a rotating shaft, T, journaled in a proper bearing within said pug-mill. The shaft is driven by a pulley, T', mounted upon the free end of said shaft. The pug-mill S should be somewhat inclined downward toward its delivery end, which end has an opening for passage of the tempered clay, as plainly shown in section, Fig. 3.

In lieu of the weight W, springs may be employed and be within the scope of my invention.

Having now fully described my invention, what I claim, and desire to secure by Letters Patent of the United States, is—

1. The combination of the horizontal turn-table C, constructed as described and mounted on a vertical axle, with the sand-table L, carrier-belt O, cutting-wheel P, and pug-mill S, substantially as described.

2. In a brick-making machine, the horizontal turn-table C, provided with rectangular apertures c, in combination with open-ended steel boxes c', having lower return-flanges, c², and, further, in combination with removable false bottoms D, said bottoms D having downward projections d', adjusted as shown, as and for the purpose intended, substantially as described.

3. In a brick-machine, the horizontal turn-table C, having apertures c, provided with steel box c', having flanges c², and false bottom D, provided with flanges d, in combination with press-blocks E, pivoted to the top of said turn-table, adapted to be operated by pressure-wheel F, all substantially as described.

4. In a brick-making machine, the horizontal turn-table C, having steel-lined apertures provided with false bottoms D, and press-blocks E, pivoted to the top of said turn-table, and flaps I, hinged to the lower side of the table, substantially as described.

5. A brick-making machine consisting of the following elements: a horizontal turn-table, C, having steel-lined apertures c, said apertures supplied with pivoted upper press-covers, E, and under swinging flaps, I, constructed as described, said turn-table having peripheral teeth that mesh with the teeth of a pinion-wheel, N, upright shafts B B', press-wheel F, mounted on horizontal shaft F', cutter-wheel P, having peripheral knives q, pug-mill S, having internal shaft, T, provided with pins t, carrier-band O, and sand-table L, all arranged as described, as and for the purposes set forth.

GEORGE W. HARDESTY.

Witnesses:
C. L. BENSON,
O. H. SULLIVAN.